United States Patent

Newell et al.

[11] Patent Number: 5,815,804
[45] Date of Patent: Sep. 29, 1998

[54] DUAL-BAND FILTER NETWORK

[75] Inventors: Michael A. Newell, Placitas; Reddy Ramachandra Vangala, Albuquerque, both of N. Mex.; Constantine Vlahos, Mundelein, Ill.

[73] Assignee: Motorola, Schaumburg, Ill.

[21] Appl. No.: 843,905

[22] Filed: Apr. 17, 1997

[51] Int. Cl.⁶ .................................................. H04B 1/44
[52] U.S. Cl. ............................. 455/78; 455/83; 455/82; 330/101; 330/103; 330/126; 330/134; 370/277; 370/480
[58] Field of Search ................... 455/78, 80, 82, 455/83, 84, 550, 575, 553; 370/277, 281, 295, 480, 488, 497; 330/101, 103, 105, 126, 132, 134

[56] References Cited

U.S. PATENT DOCUMENTS

| | | | |
|---|---|---|---|
| 2,165,794 | 7/1939 | Holmes | 343/876 |
| 2,223,049 | 11/1940 | Reichle | 250/13 |
| 2,885,677 | 5/1959 | Zaleski | 343/777 |
| 3,177,430 | 4/1965 | Smee et al. | 370/277 |
| 4,001,832 | 1/1977 | Chesneau et al. | 343/747 |
| 4,357,608 | 11/1982 | Lewis | 343/5 |
| 4,910,481 | 3/1990 | Sasaki et al. | 370/277 |
| 4,914,714 | 4/1990 | Tamura | 455/78 |
| 4,980,660 | 12/1990 | Nakamura et al. | 455/78 |
| 5,015,973 | 5/1991 | Kawakami et al. | 455/83 |
| 5,021,756 | 6/1991 | Tajima et al. | 330/54 |
| 5,021,801 | 6/1991 | Smith et al. | 343/876 |
| 5,339,454 | 8/1994 | Kuo et al. | 455/247.1 |
| 5,386,203 | 1/1995 | Ishihara | 455/82 |
| 5,465,410 | 11/1995 | Hiben et al. | 455/266 |
| 5,535,432 | 7/1996 | Dent | 455/77 |
| 5,584,056 | 12/1996 | Kim | 455/89 |
| 5,732,330 | 3/1998 | Anderson et al. | 455/76 |

FOREIGN PATENT DOCUMENTS

| | | |
|---|---|---|
| 446050A | 9/1991 | European Pat. Off. . |
| 58-2000636 | 11/1983 | Japan . |
| 1-212929 | 8/1989 | Japan . |
| 2-150125 | 6/1990 | Japan . |
| 3-66232 | 3/1991 | Japan . |

*Primary Examiner*—Nguyen Vo
*Assistant Examiner*—Darnell R. Armstrong
*Attorney, Agent, or Firm*—Gary J. Cunningham; Colin M. Raufer

[57] ABSTRACT

A dual band filter network for a radio communication apparatus is provided. The network has an antenna (212) for receiving and transmitting signals from a first frequency band and a second frequency band. The network has a first duplex pair (202) including a first transmit filter (204) including a first passband and stopband. The first duplex pair (202) also includes a second receive filter (206). The first filter (204) presents a consistent phase in the second passband due to the wide frequency separation between the first filter (204) and the second filter (206). The network has a second duplex pair (202') with similar characteristics as the first duplex pair (202). The network also has a switching circuitry (210) controlled by a switch control voltage (214) for selecting the appropriate filter circuitry. The network can be provided in a small sized, low cost package that also offers improved insertion loss performance.

23 Claims, 4 Drawing Sheets

5,815,804

DUAL-BAND FILTER NETWORK

FIELD OF THE INVENTION

This invention relates to filter networks for cellular telephones and other signal processing devices and, in particular, to a dual band filter network.

BACKGROUND OF THE INVENTION

The need for filter components to selectively attenuate a signal in a cellular telephone is well known. Typically, this is accomplished using dielectric ceramic monoblocks having through-holes which serve as resonators which typically function as quarter wavelength transmission lines. Other filtering possibilities include surface-acoustic wave (SAW) devices, multilayer ceramics, helical resonators, or other discrete filtering components.

FIG. 1 shows a schematic of a prior art filter network. As is shown in FIG. 1, prior art filter networks typically use a pair of duplexers 102 and 102', each duplexer including a transmit (Tx) filter and a receive (Rx) filter. The duplexers are then further duplexed together via transmission lines 104 and 104' to feed a common antenna 106. A signal entering through the antenna passes through one of the four filters (each duplexer contains two filters) and gets rejected by the other three filters due to the frequency selective characteristics of these filters.

In the filter network of the prior art, the first duplexer operates in a first frequency band and the second duplexer operates in a second frequency band. Therefore, the transmit (Tx) and receive (Rx) filters in each duplexer are necessarily of the same frequency band. As such, the transmit (Tx) and the receive (Rx) filters in the duplexer have very closely spaced passband frequencies. Due to this frequency spacing limitation, the insertion loss values at the inside passband edges of the frequency response curve are very high. This is shown graphically in FIG. 8. These very high insertion loss values, which substantially reduce battery life and talk time in cellular telephones, are due primarily to the interaction between the two closely spaced filters (Tx and Rx) of each duplexer.

However, as dual band radio designs are becoming increasingly popular, there is a need for a new dual band filter network to meet the decreasing size, weight, and volume requirements of these new radio designs. A dual band filter network is also needed which will address the insertion loss problem. The need for dual band (e.g. GSM & DCS) antenna filtering requires an improvement in the circuit design of the antenna and filtering configuration of the portable radio devices currently available in the market. Although paired ceramic block duplexers will continue to find many applications, other filtering technologies such as multilayer ceramics and surface acoustic wave (SAW) filters may also be designed into the emerging dual band filter networks.

Cellular system designers are looking to create radio designs capable of handling two or more frequency bands operating in the same regions at the same time. In effect, the front end of the radio should be capable of "transparent hand-offs" between the systems (e.g. GSM & DCS) which may be operating in the same city at the same time.

A dual band filter network design in which four filters are connected in a small size, low cost package and in which the frequency separation between the bands of interest is used to advantageously provide low insertion loss filtering of the signal would be considered an improvement in the art.

DETAILED DESCRIPTION OF THE PREFERRED EMBODIMENTS

Figure 1:
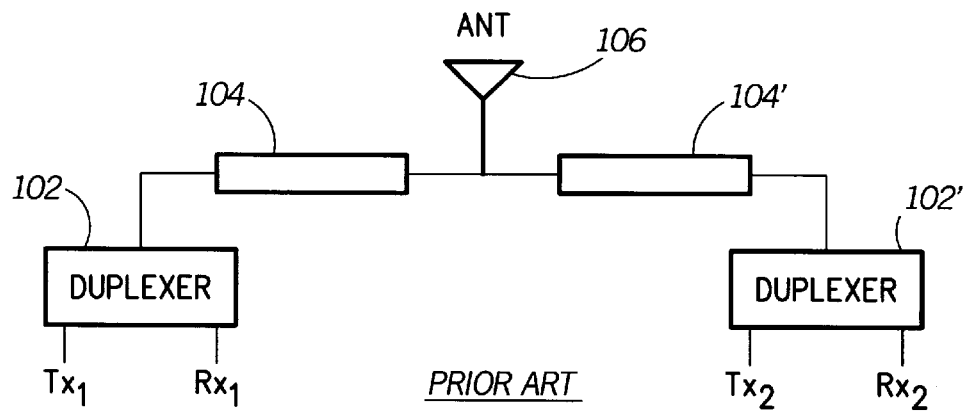
FIG. 1 shows a schematic of a prior art filter network.
Figure 2:
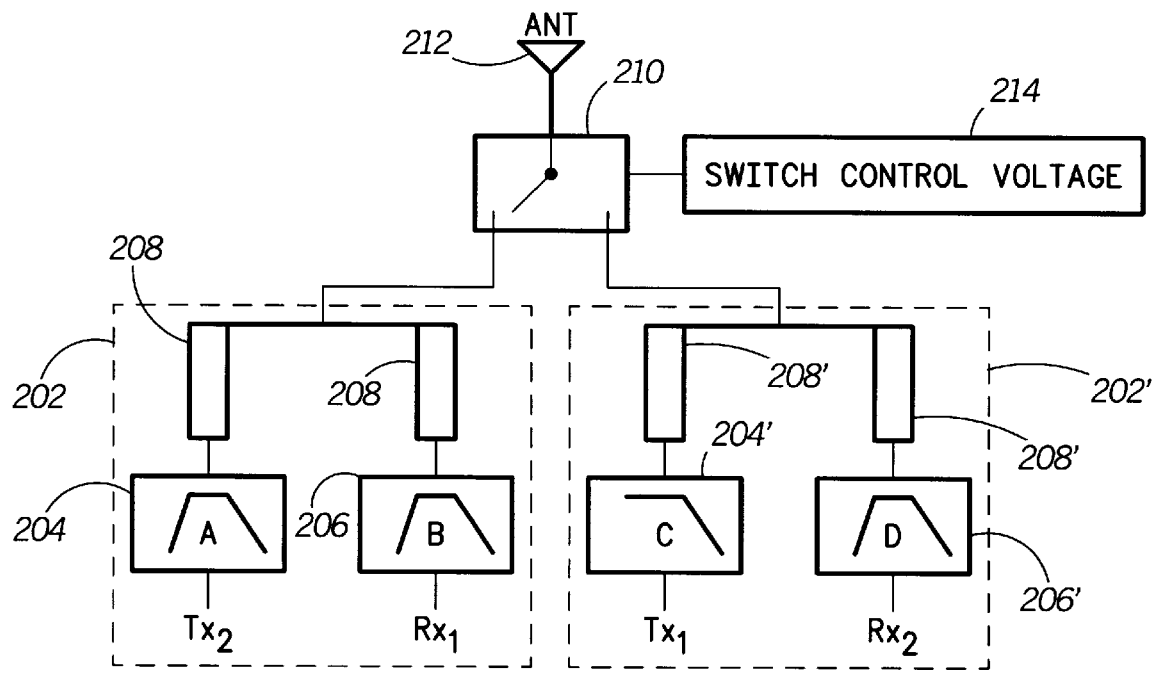
FIG. 2 shows a schematic of a dual band filter network in accordance with one embodiment of the present invention.

FIG. 2 shows a schematic/block diagram of a dual band filter network. The dual band filter network is capable of operating in both a first and a second frequency band. Referring to FIG. 2, a first duplex pair 202 including a first transmit filter 204 is provided. Filter 204 includes a first passband in the second frequency band and a first stopband in the first frequency band.

A second receive filter 206 is also included in the first duplex pair 202. Filter 206 includes a second passband in the first frequency band and a second stopband in the second frequency band. The first filter 204 and the second filter 206 together define a first duplex pair 202. In this embodiment, filters 204 and 206 are connected by transmission lines 208.

Also shown in FIG. 2 is a second duplex pair 202'. The second duplex pair 202' includes a third transmit filter 204'. Filter 204' includes a third passband in the first frequency band and a third stopband in the second frequency band. Second duplex pair 202' also includes a fourth receive filter 206' which includes a fourth passband in the second frequency band and a fourth stopband in the first frequency band. The third filter 204' and fourth filter 206' together define a second duplex pair 202'. Filters 204' and 206' are connected by transmission lines 208' which act as duplex lines. Duplex lines are phase transmissions that present a substantially open circuit (high impedance) in the passband of the paired filter.

Also included in the dual band filter network of FIG. 2 is a switching means 210 capable of operating in a first condition and a second condition. In the first condition, switching means 210 connects an antenna 212 to only the first duplex pair 202. Antenna 212 is capable of both receiving and transmitting signals from a first frequency band and a second frequency band. In the second condition, switching means 210 connects antenna 212 to only the second duplex pair 202'. The switching means 210 is controlled by a switch control voltage 214.

By arranging the various filters in this manner in a network configuration, certain advantages are realized. Namely, the first filter presents a consistent phase in the second passband and the second filter presents a consistent phase in the first passband. This is a result of the wide frequency separation between the first filter and the second filter. Moreover, consistent phase allows the use of a fixed length transmission line for duplexing without any adverse effects on the passband response.

Similarly, with respect to the second duplex pair, the third filter presents a consistent phase in the fourth passband and the fourth filter presents a consistent phase in the third passband due to the wide frequency separation between the third and fourth filters.

An important advantage of the present invention is that by arranging the filters as shown in the dual band filter network of FIG. 2, a lower insertion loss is realized, resulting in improved performance from the dual band filter network. This is achieved by the elimination of a near band duplexing effect and the selection of a technology that is best suited for a specific application. The lower insertion loss is achieved at the inside passband edges of the respective duplex pairs.

Figure 8:
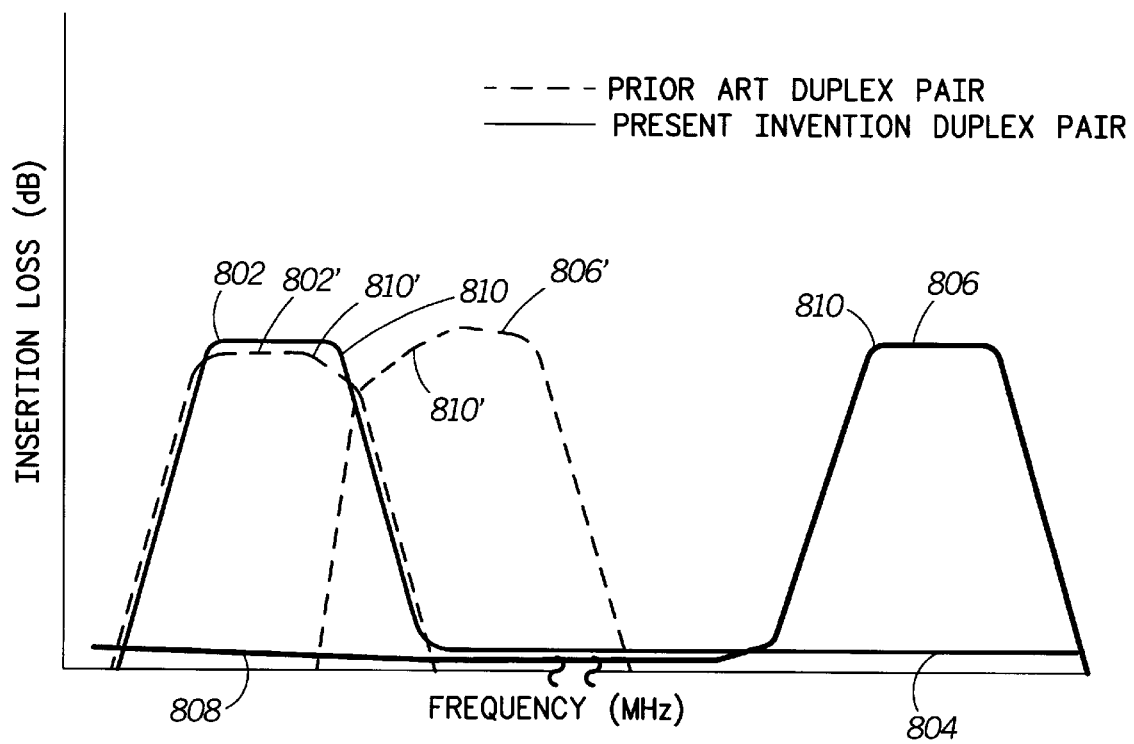
FIG. 8 shows a plot of the insertion loss versus frequency graphs for the prior art and the dual band filter network of the present invention.

In other words, the first duplex pair have a lower insertion loss at an inside passband edge of the first passband and the second passband (see FIG. 8). Similarly, the second duplex pair have a lower insertion loss at an inside passband edge of the third passband and the fourth passband. Moreover, if the bandpass is widened, a lower insertion loss may be realized over an entire frequency band of interest. The improved insertion loss values of the present invention offer real advantages in the form of longer talk time and battery life in cellular telephones, and thus justify the dual band filter network design.

The type of filters used in the dual band filter network is another important factor in achieving a high level of performance from the filter network. In FIG. 2, the four filters are designated 204, 206, 204' and 206' respectively.

Filter 204 may be a very broadband bandpass filter. Broad bandwidth allows the filter to be small in size and have a low insertion loss. In a preferred embodiment, filter 204 would be manufactured in a multilayer ceramic package.

Filters 206 and 206' may be bandpass filters to protect the receiver from spurious interference or compression due to strong unwanted signals. In a preferred embodiment, filter 206 would be a SAW device for size and performance reasons. Filter 206' may be a ceramic block due to the frequency and performance requirements.

Filter 204' may be a lowpass filter used to prevent harmonic content generated in the transmitter final stage. In a preferred embodiment, filter 204' may also be made from a multilayer ceramic material.

Although one preferred embodiment requires a combination of a ceramic block filter, a SAW device and a multilayer ceramic, various construction techniques are contemplated by the present invention. The use of all SAWs, all ceramic monoblocks, all ceramic multilayer or any combination thereof are contemplated by the present invention for use in the dual band filter network. The only significant challenge involves guaranteeing that the high frequency of one band be duplexed with the low frequency of the other band. So long as this is achieved, the actual method of manufacturing the filter becomes dependent upon the specific filter design requirements.

Figure 3:
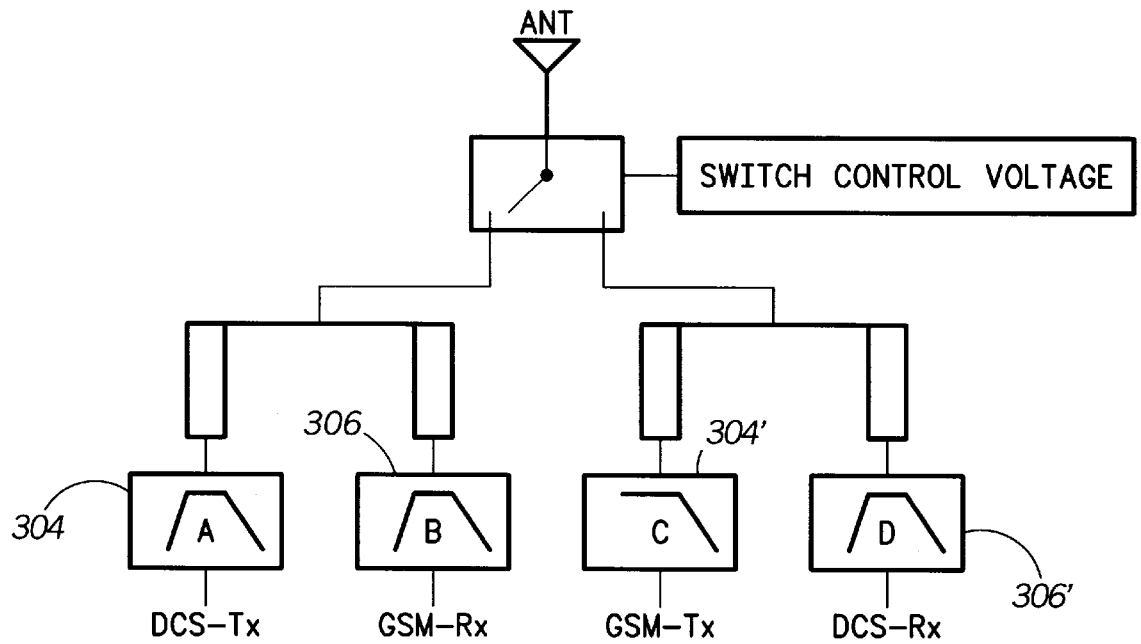
FIG. 3 shows a dual band filter network for the Global System for Mobile Communication (GSM) and the Digital Cellular System (DCS) bands of the radio frequency spectrum in accordance with the present invention.

FIG. 3 shows a specific example of the dual band filter network applied to the DCS and GSM frequency bands. FIG. 3 is substantially identical to FIG. 2 and all reference numbers in FIG. 2 are hereby incorporated into FIG. 3. Referring to FIG. 3, the Digital Cellular System (DCS) is used for digital cellular telephones and has a mobile frequency range in the receive mode (Rx) of 1805–1880 MHz. The frequency range for the transmit mode (Tx) is 1710–1785 MHz. The Global System for Mobile Communications (GSM) is also used for digital cellular telephones and has a mobile frequency range in the receive (Rx) mode of 925–960 MHz. The frequency range for the transmit (Tx) mode is 880–915 MHz.

In FIG. 3, the DCS-Tx filter 304 at 1710–1785 MHz is advantageously duplexed (paired or connected to) the GSM-Rx filter 306 at 925–960 MHz. Similarly, the GSM-Tx filter 304' at 880–915 MHz is duplexed with the DCS-Rx filter 306' at 1805–1880. By arranging the filters in this configuration, better insertion loss values are achieved and a dual band filter network in a small size, low cost package is realized.

The importance of band separation in each duplex pair cannot be understated. In the case of GSM and DCS frequency bands, the band separation is almost an octave. The present invention takes full advantage of this wide frequency separation to pair the filters in such a way as to improve the insertion loss of the system. Additionally, by pairing the filters in this manner, the magnitude of the reflective phase coefficient out of band is approximately equal to one. This is important because it will result in improved duplexing characteristics.

Figure 4:
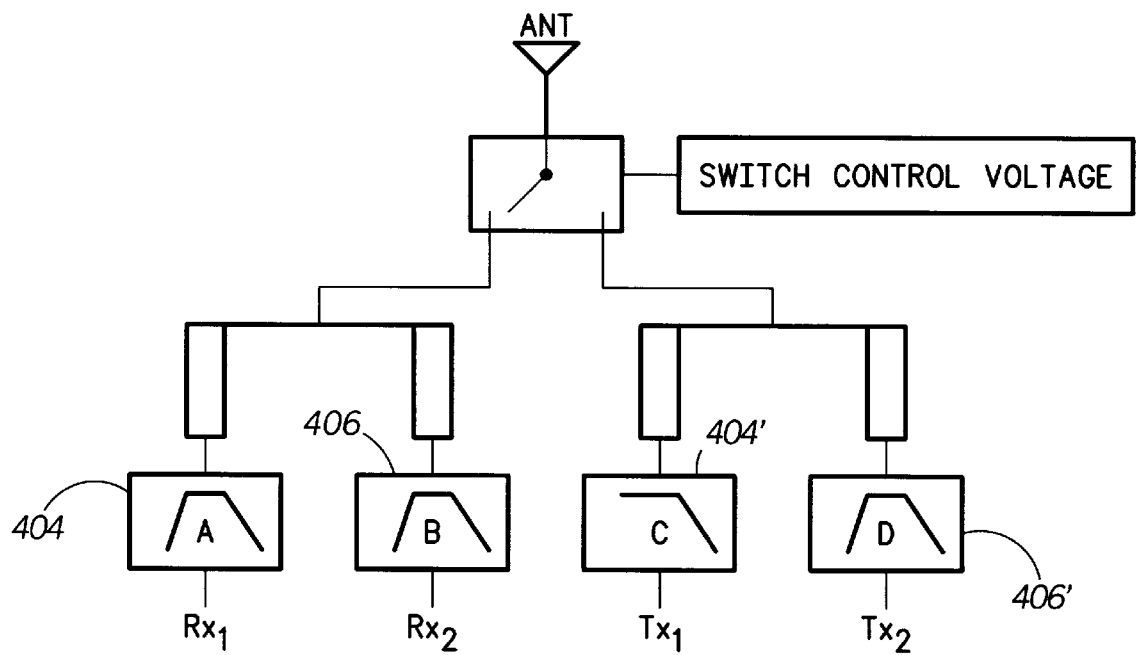
FIG. 4 shows another embodiment of the present invention in which the transmit (Tx) and receive (Rx) filters are paired together in the dual band filter network.

FIG. 4 shows an embodiment of the present invention in which the two receive (Rx) filters 404, 406 are duplexed together to provide a first duplex pair and the two transmit (Tx) filters 404', 406' are duplexed together to provide a second duplex pair. FIG. 4 is substantially identical to FIG. 2 and all reference numbers in FIG. 2 are hereby incorporated into FIG. 4. Referring to FIG. 4, the receive filter 404 from a first frequency band is duplexed to the receive filter 406 from the second frequency band. Similarly, the transmit filter 404' from the first frequency band is duplexed to the transmit filter 406' from the second frequency band. If a single transmitter and a single receiver, each capable of handling both bands is employed, such an arrangement may offer significant insertion loss benefits over the prior art.

Figure 5:
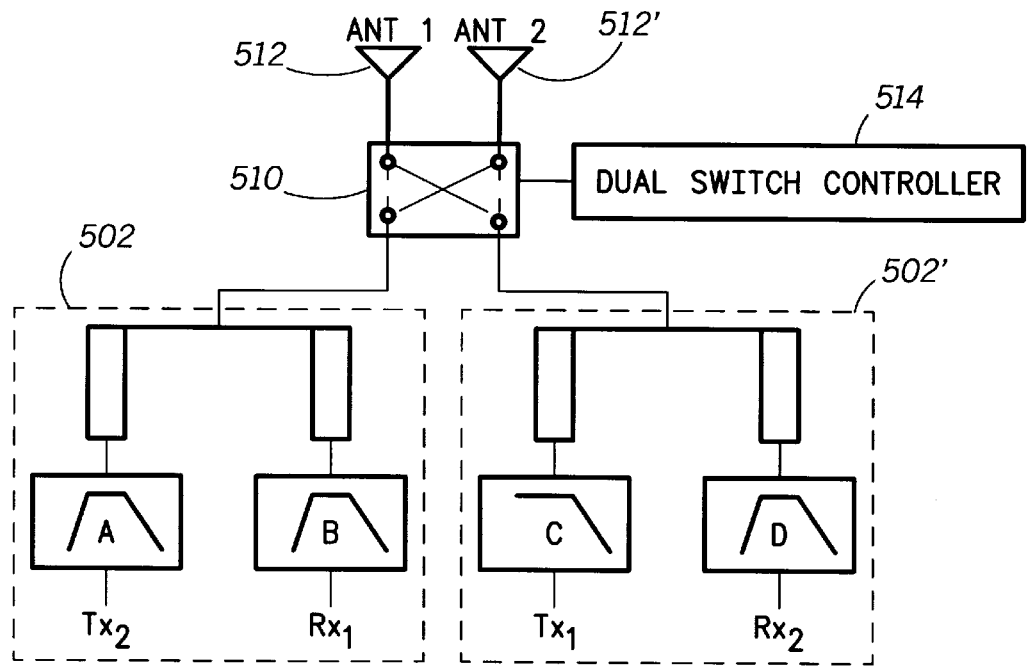
FIG. 5 shows an embodiment of the present invention having a dual switch controller.

FIG. 5 shows an embodiment of the present invention having a dual switch controller. FIG. 5 is substantially identical to FIG. 2 and all reference numbers in FIG. 2 are hereby incorporated into FIG. 5. One important aspect of the present invention will be the switching means 510 which will be used to connect the dual band filter network. In a preferred embodiment, the switching means 510 will be a broadband switch which can be in the form of a gallium arsenide (GaAs), pin diode based, or other style switch. The switching means 510 is controlled by a dual switch controller 514.

An advantage of having only one control switch is that there is less current drain, resulting in a longer battery life. Additionally, the switching means 510 may be an independent and discrete component, or it may be integrated directly into the multilayer package which houses at least one of the filters of the dual band filter network.

Referring to FIG. 5, the switching means 510 will be able to align the dual band filter network with a first frequency band which employs a first antenna 512 or with a second frequency band which employs a second antenna 512'. The dual switch controller 514 allows both antennas 512, 512' to access both a first duplex pair 502 or a second duplex pair 502' depending upon the mode of operation of a communication device at a given time.

Figure 6:
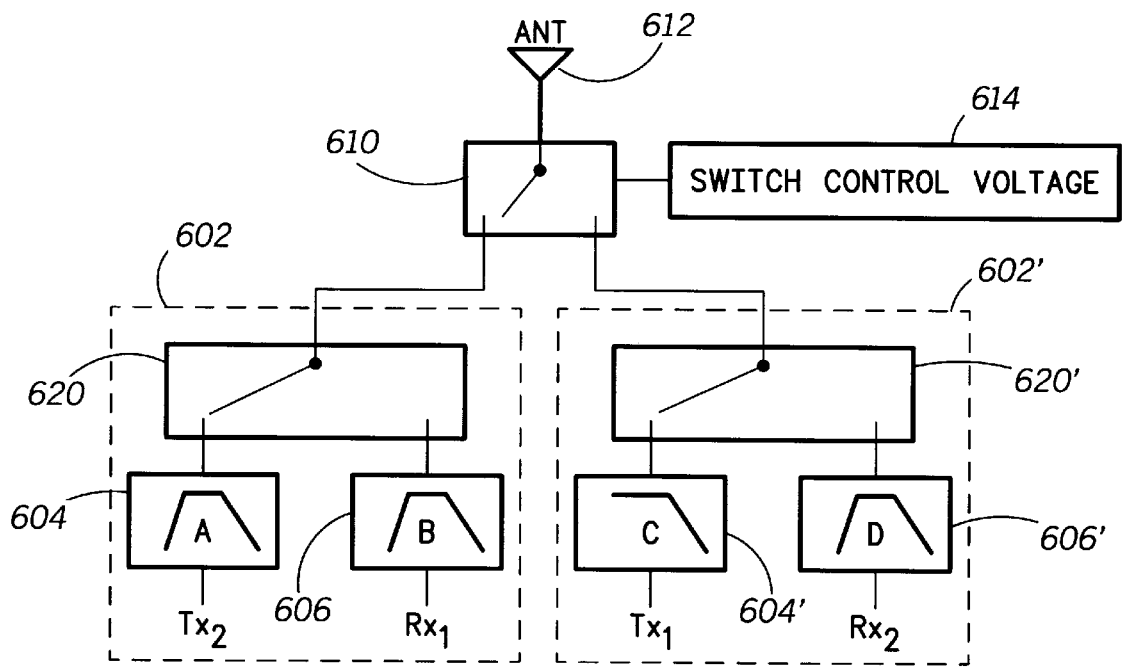
FIG. 6 shows an embodiment of the present invention having multiple switches.

FIG. 6 shows another embodiment of the present invention having multiple switches. In FIG. 6, switching means 610 is capable of operating in a first condition and a second condition. In the first condition, switching means 610 connects the antenna 612 to a first duplex pair 602 only. In the second condition, switching means 610 connects the antenna 612 to a second duplex pair 602' only. The switching means 610 is controlled by a switch control voltage 614.

FIG. 6 is included in the figures to show an embodiment having a second switch 620 which connects the first filter 604 with the second filter 606. Similarly, a third switch 620' connects the third filter 604' with the fourth filter 606'. This design feature offers greater flexibility to the network designer and allows for more control options in the dual band filter network.

It is important to recognize that the filters in the dual band filter network can be connected, coupled, or duplexed using other methods than merely transmission lines or switches. A radio communication apparatus with the present dual band filter network may also connect the filters using distributed transmission lines or lumped phase shift networks consisting of capacitors and inductors.

In FIGS. 2–6, the first through fourth filters are respectively labeled filters 204, 206, 204' and 206'. The dual band filter network of the present invention does not intend to limit the choices as to the exact filtering capabilities of each filter. For example, in one embodiment, all four filters may be bandpass filters. In another embodiment, filters 204, 206, and 206' may be bandpass filters and filter 204' may be a lowpass filter.

In one embodiment of the present invention, the transmit filter for the lower frequency band has a primary function of rejecting the harmonics generated in the power amplifier. These harmonics are very far away from the transmit passband. Similarly, the receive filter duplexed with the transmit filter is also far from the transmit passband. As such, a small, lowpass filter can be used as a transmit filter for the lower frequency band.

In still another embodiment, two of the filters (e.g. filters 204 and 204') are bandstop filters and two of the filters (e.g. filters 206 and 206') are bandpass filters. This may be desirable in cases where harmonic rejection is built into the bandstop filter. Compared with bandpass filters, these bandstop filters offer relatively low insertion loss characteristics. Various types of filters are capable of being designed into the dual band filter network of the present invention depending upon the signal processing requirements of the specific application.

The dual band filter network of the present invention may also be designed using various filtering technologies. For example, the network could be manufactured using all monolithic blocks of ceramic, all filters in a single multilayer package or all filters using surface acoustic wave (SAW) technology. A functional network could also be designed using a combination of the technologies described above. In one embodiment, the first duplex pair (filters 204 and 206) are provided in a monolithic block of ceramic and a second duplex pair (filters 204' and 206') are also provided in a monolithic block of dielectric ceramic.

Figure 7:
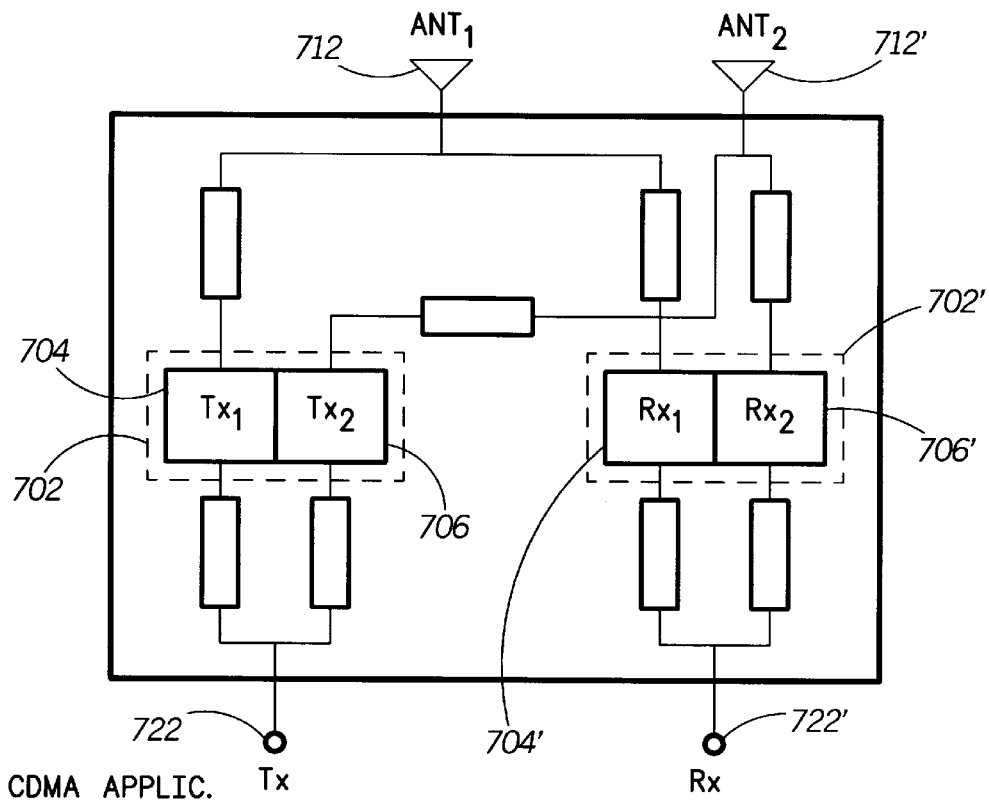
FIG. 7 shows the dual band filter network of the present invention applied to a Code Division Multiple Access (CDMA) signal processing application having two antennas.

FIG. 7 shows the dual band filter network of the present invention applied to a Code Division Multiple Access (CDMA) cellular telephone application having two antennas. Referring to FIG. 7, a first duplex pair 702 including a first transmit filter 704 including a first passband in the first frequency band and a first stopband in the second frequency band is provided. A second transmit filter 706 including a second passband in the second frequency band and a second stopband in the first frequency band is also provided. The first filter 704 and second filter 706 together define a first duplex pair.

The first filter 704 presents a consistent phase in the second passband and the second filter 706 presents a consistent phase in the first passband due to the wide frequency separation between the first filter 704 and the second filter 706.

Also included in FIG. 7 is a second duplex pair 702' including a third receive filter 704' including a third passband in the first frequency band and a third stopband in the second frequency band. A fourth receive filter 706' including a fourth passband in the second frequency band and a fourth stopband in the first frequency band is also provided. The third filter 704' and the fourth filter 706' together define a second duplex pair.

The third filter 704' presents a consistent phase in the fourth passband and the fourth filter 706' presents a consistent phase in the third passband due to the wide frequency separation between the third filter 704' and the fourth filter 706'.

FIG. 7 was included to show a unique transmission line layout specifically designed for a dual band, dual antenna, application. In FIG. 7, the second duplex pair 702' provide a common receive port 722' and a lower insertion loss at an inside passband edge of the third passband and the fourth passband. Similarly, the first duplex pair 702 providing a common transmit port 722 and a lower insertion loss at an inside passband edge of the first passband and the second passband.

Another important feature of FIG. 7 is that there are two antenna ports, one for each frequency band. A first frequency band antenna 712 is connected, via transmission lines, to the first filter 704 and the third filter 704'. A second frequency band antenna 712' is connected, via transmission lines, to the second filter 706 and the fourth filter 706'. FIG. 7 shows a dual band filter network design adaptable to any dual band cellular telephone application.

FIG. 8 shows a plot of the insertion loss versus frequency graphs for the prior art and the dual band filter network of the present invention. This graph visually shows one of the important features of the present invention, namely, the improved insertion loss values realized with the dual band filter network.

In FIG. 8, the frequency response for one pair of duplexed filters (e.g. filters one and two) is shown. Of course, the dual band filter network also includes a third and a fourth filter duplexed together. However, their frequency response curve will look substantially identical to that shown in FIG. 8 albeit at a slightly different frequency.

Referring to FIG. 8, the prior art frequency response for a first filter 802' is shown as a dashed line. The prior art frequency response for a second filter 806' is also shown as a dashed line. It is significant to note that under the prior art configuration, since the frequencies of the first and second filter are of the same frequency band, they are very close together. As such, due to the interaction between the two filters, the inside passband edges 810' have a gradual slope which corresponds to greater insertion loss characteristics which may degrade the overall performance of the radios in which these filters are used.

The present invention is shown with reference to the solid line frequency response curves shown in FIG. 8. A first filter has a passband 802 and a stopband 804. The second filter, since it is at an entirely different frequency, has a passband 806 and a stopband 808. Passband 806 is far removed from the first filter's passband 802. Consequently, the inside passband edges 810 are substantially sharper with this dual band filter network design and offer improved overall performance in the filter network due to the better insertion loss characteristics.

Stated another way, the first duplex pair have a lower insertion loss at the inside passband edge of the first and second passband as compared with the prior art design. As was stated previously, the same is true for the second duplex pair containing the third and fourth filters.

Although various embodiments of this invention have been shown and described, it should be understood that various modifications and substitutions, as well as rearrangements and combinations of the preceding embodiments, can be made by those skilled in the art, without departing from the novel spirit and scope of this invention. Additionally, the present invention may also be applied to multi-band filter networks capable of simultaneously handling multiple bands using the networking principles disclosed herein.

What is claimed is:

1. A radio communication apparatus, comprising:
   an antenna for receiving and transmitting signals from a first frequency band and a second frequency band;
   a first duplex pair including a first transmit filter including a first passband in the second frequency band and a first stopband in the first frequency band and a second receive filter including a second passband in the first frequency band and a second stopband in the second frequency band;
   the first filter presenting a consistent phase in the second passband and the second filter presenting a consistent phase in the first passband due to a wide frequency separation between the first filter and the second filter;
   the first duplex pair having a lower insertion loss at an inside passband edge of the first passband and the second passband;
   a second duplex pair including a third transmit filter including a third passband in the first frequency band and a third stopband in the second frequency band and a fourth receive filter including a fourth passband in the second frequency band and a fourth stopband in the first frequency band;
   the third filter presenting a consistent phase in the fourth passband and the fourth filter presenting a consistent phase in the third passband due to a wide frequency separation between the third filter and the fourth filter;
   the second duplex pair having a lower insertion loss at an inside passband edge of the third passband and the fourth passband; and
   a switching means capable of operating in a first condition and a second condition for, in the first condition, connecting the antenna to the first duplex pair only, and, in the second condition, connecting the antenna to the second duplex pair only, the switching means controlled by a switch control voltage.

2. The radio communication apparatus of claim 1, wherein the switching means includes a second switch between the first filter and the second filter and a third switch between the third and the fourth filter.

3. The radio communication apparatus of claim 1, wherein the first duplex pair are provided in a monolithic block of ceramic and the second duplex pair are provided in a monolithic block of ceramic.

4. The radio communication apparatus of claim 1, wherein the first filter and the second filter are connected using distributed transmission lines.

5. The radio communication apparatus of claim 1, wherein the first filter and the second filter are connected using lumped phase shift networks.

6. The radio communication apparatus of claim 1, wherein the switching means includes a dual switch controller for dual antenna applications.

7. The radio communication apparatus of claim 1, wherein the first filter, the second filter, the third filter, and the fourth filter are all bandpass filters.

8. The radio communication apparatus of claim 1, wherein the first filter, the second filter and the fourth filter are bandpass filters and the third filter is a lowpass filter.

9. The radio communication apparatus of claim 1, wherein the first filter, the second filter and the fourth filter are bandpass filters and the third filter is a bandstop filter.

10. The radio communication apparatus of claim 1, wherein the first filter and the third filter are bandstop filters and the second filter and the fourth filter are bandpass filters.

11. The radio communication apparatus of claim 1, wherein the first filter, the second filter, the third filter and the fourth filter are at least one of dielectric monolithic blocks of ceramic, multilayer ceramic packages, and surface acoustic wave filters.

12. A radio communication apparatus, comprising:
    an antenna for receiving and transmitting signals from a first frequency band and a second frequency band;
    a first duplex pair including a first receive filter including a first passband in the first frequency band and a first stopband in the second frequency band and a second receive filter including a second passband in the second frequency band and a second stopband in the first frequency band;
    the first filter presenting a consistent phase in the second passband and the second filter presenting a consistent phase in the first passband due to a wide frequency separation between the first filter and the second filter;
    the first duplex pair having a lower insertion loss at an inside passband edge of the first passband and the second passband;
    a second duplex pair including a third transmit filter including a third passband in the first frequency band and a third stopband in the second frequency band and a fourth transmit filter including a fourth passband in the second frequency band and a fourth stopband in the first frequency band;
    the third filter presenting a consistent phase in the fourth passband and the fourth filter presenting a consistent phase in the third passband due to a wide frequency separation between the third filter and the fourth filter;
    the second duplex pair having a lower insertion loss at an inside passband edge of the third passband and the fourth passband; and
    a switching means capable of operating in a first condition and a second condition for, in the first condition, connecting the antenna to the first duplex pair only, and, in the second condition, connecting the antenna to the second duplex pair only, the switching means controlled by a switch control voltage.

13. The radio communication apparatus of claim 12, wherein the switching means includes a second switch between the first filter and the second filter and a third switch between the third and the fourth filter.

14. The radio communication apparatus of claim 12, wherein the first duplex pair are provided in a monolithic block of ceramic and the second duplex pair are provided in a monolithic block of ceramic.

15. The radio communication apparatus of claim 12, wherein the first filter and the second filter are connected using distributed transmission lines.

16. The radio communication apparatus of claim 12, wherein the first filter and the second filter are connected using lumped phase shift networks.

17. The radio communication apparatus of claim 12, wherein the switching means includes a dual switch controller for dual antenna applications.

18. The radio communication apparatus of claim 12, wherein the first filter, the second filter, the third filter, and the fourth filter are all bandpass filters.

19. The radio communication apparatus of claim 12, wherein the first filter, the second filter and the fourth filter are bandpass filters and the third filter is a lowpass filter.

20. The radio communication apparatus of claim 12, wherein the first filter, the second filter and the fourth filter are bandpass filters and the third filter is a bandstop filter.

21. The radio communication apparatus of claim 12, wherein the first filter and the third filter are bandstop filters and the second filter and the fourth filter are bandpass filters.

22. The radio communication apparatus of claim 12, wherein the first filter, the second filter, the third filter and the fourth filter are at least one of dielectric monolithic blocks of ceramic, multilayer ceramic packages, and surface acoustic wave filters.

23. A radio communication apparatus for a Code Division Multiple Access cellular telephone application, comprising:

a first duplex pair including a first transmit filter including a first passband in the first frequency band and a first stopband in the second frequency band and a second transmit filter including a second passband in the second frequency band and a second stopband in the first frequency band;

the first filter presenting a consistent phase in the second passband and the second filter presenting a consistent phase in the first passband due to a wide frequency separation between the first filter and the second filter;

the first duplex pair providing a common transmit port and a lower insertion loss at an inside passband edge of the first passband and the second passband;

a second duplex pair including a third receive filter including a third passband in the first frequency band and a third stopband in the second frequency band and a fourth receive filter including a fourth passband in the second frequency band and a fourth stopband in the first frequency band;

the third filter presenting a consistent phase in the fourth passband and the fourth filter presenting a consistent phase in the third passband due to a wide frequency separation between the third filter and the fourth filter;

the second duplex pair providing a common receive port and a lower insertion loss at an inside passband edge of the third passband and the fourth passband;

a first frequency band antenna connected to the first filter and the third filter; and a second frequency band antenna connected to the second filter and the fourth filter.

* * * * *